(12) United States Patent
Ger et al.

(10) Patent No.: US 7,391,170 B2
(45) Date of Patent: Jun. 24, 2008

(54) DEVICE FOR DRIVING LIGHT SOURCE MODULE

(75) Inventors: Chih-Chan Ger, Taipei Hsien (TW); Chih-Chang Chang, Taipei Hsien (TW); Chi-Wen Kan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/565,663

(22) Filed: Dec. 1, 2006

(65) Prior Publication Data
US 2007/0252533 A1   Nov. 1, 2007

(30) Foreign Application Priority Data
Apr. 28, 2006   (TW)   .............................. 95115311 A

(51) Int. Cl.
*G05F 1/00*   (2006.01)
(52) U.S. Cl. ................ 315/291; 315/307; 315/224; 315/276; 315/312
(58) Field of Classification Search ................. 315/291, 315/307, 312–326, 224, 274–279, 225
See application file for complete search history.

(56) References Cited

U.S. PATENT DOCUMENTS

2006/0273743 A1*   12/2006   Adam ........................ 315/308

FOREIGN PATENT DOCUMENTS

TW         M288077         2/2006

* cited by examiner

*Primary Examiner*—Tuyet Vo
(74) *Attorney, Agent, or Firm*—Wei Te Chung

(57) ABSTRACT

A voltage sensing circuit (230) for sensing voltage signals of input alternating current (AC) signals includes a plurality of voltage dividing circuits (23$n$ ($n$=1, 2, 3, . . . , n)) and a charging circuit (232). The voltage dividing circuits are used for dividing voltage signals of the input AC signals. The voltage dividing circuits are connected to the charging circuit, and then the divided voltage signals can be transmitted between the voltage dividing circuits, thereby pulling high corresponding DC levels of the divided voltage signals.

17 Claims, 5 Drawing Sheets

DEVICE FOR DRIVING LIGHT SOURCE MODULE

BACKGROUND OF THE INVENTION

1. Field of the Invention

The invention relates to electronic driving devices, and particularly to a device for driving discharge lamps in a light source module of a liquid crystal display (LCD) panel.

2. Description of Related Art

Conventionally, a liquid crystal display (LCD) panel uses discharge lamps, such as cold cathode fluorescent lamps (CCFLs), as a light source of a backlight system. Typically, an inverter circuit outputs an alternating current (AC) signal to drive the CCFLs. If voltage of the AC signal output from the inverter circuit is too great, the CCFLs may be damaged; and if the voltage of the AC signal output from the inverter circuit is too low, the CCFLs cannot be started. Therefore, a voltage sensing circuit and a protection circuit are required in the inverter circuit.

Referring to FIG. 4, a block diagram of a conventional driving device 10 for driving a light source module 140 is shown. The driving device 10 includes a driving circuit 100, a transformer circuit 110, a protection circuit 120, and a voltage sensing circuit 130. The transformer circuit 110 outputs an AC signal to the light source module 140. The voltage sensing circuit 130 reads a magnitude of voltage of the AC signal via capacitors C1, C2, and C3 thereof. If the magnitude of the voltage is too great after rectification of the voltage signal by a half-wave rectifier D1 of the voltage sensing circuit 130, the voltage sensing circuit 130 directly outputs an over-voltage signal to the protection circuit 120. However, the driving device of FIG. 4 fails to provide under-voltage protection.

FIG. 5 is a block diagram of another conventional driving device 10' for driving a light source module 140. Modules of the driving device 10' are substantially the same as those of the driving device 10, except a voltage sensing circuit 130' and a protection circuit 120'. The voltage sensing circuit 130' reads a magnitude of the voltage of the AC signal output from the transformer circuit 110 via capacitors C1, C2, and C3 of the voltage sensing circuit 130'. If the voltage signal is abnormal, after a half-wave rectifier D1 rectifies the voltage signal and diodes D2 and D3 divide the voltage signal, the voltage sensing circuit 130' outputs an under-voltage signal or an over-voltage signal to the protection circuit 120'. However, this device is susceptible to interference, and circuit impedances thereof are high.

SUMMARY OF THE INVENTION

An exemplary embodiment of the invention provides a driving device for driving a light source module including a plurality of lamps. The driving device includes a driving circuit, a transformer circuit, and a voltage sensing circuit. The driving circuit converts a received direct current (DC) signal to an alternating current (AC) signal. The transformer circuit is connected to the driving circuit, for converting the AC signal to an appropriate signal to drive the lamps. The voltage sensing circuit is connected to the transformer circuit, for sensing a voltage signal of the signal provided to the light source module. The voltage sensing circuit includes a plurality of voltage dividing circuits and a charging circuit. The voltage dividing circuits are connected between corresponding lamps and the charging circuit, for dividing the voltage signal provided to the lamps. The voltage dividing circuits are connected to the charging circuit, and then the divided voltage signal can be transmitted between the voltage dividing circuits when there is a problem with one or more lamps, thereby pulling high a corresponding DC level of the divided voltage signal.

Another exemplary embodiment of the invention provides a voltage sensing circuit for sensing a voltage signal of an input AC signal. The voltage sensing circuit includes a plurality of voltage dividing circuits and a charging circuit. The voltage dividing circuits are connected between corresponding lamps and the charging circuit, for dividing the sensed voltage signal. In addition, the voltage dividing circuits are connected to the charging circuit, and the divided voltage signal can be transmitted between the voltage dividing circuits, thereby pulling high a corresponding DC level of the divided voltage signal.

Another exemplary embodiment of the present invention provides a driving device for driving a light source module including a plurality of lamps. The driving device includes a driving circuit, a transformer circuit, a voltage sensing circuit, and a protection circuit. The driving circuit converts a received direct current (DC) signal to an alternating current (AC) signal. The transformer circuit is connected to the driving circuit, for converting the AC signal to an appropriate signal to drive the light source module. The voltage sensing circuit outputs a sensed voltage signal according to a variable DC voltage level when there is a problem with one or more lamps. The protection circuit is connected between the transformer circuit and the voltage sensing circuit, for determining whether the sensed voltage signal is normal and outputting a protection signal.

Other advantages and novel features will become more apparent from the following detailed description of preferred embodiments when taken in conjunction with the accompanying drawings, in which:

DETAILED DESCRIPTION OF THE INVENTION

Figure 1:
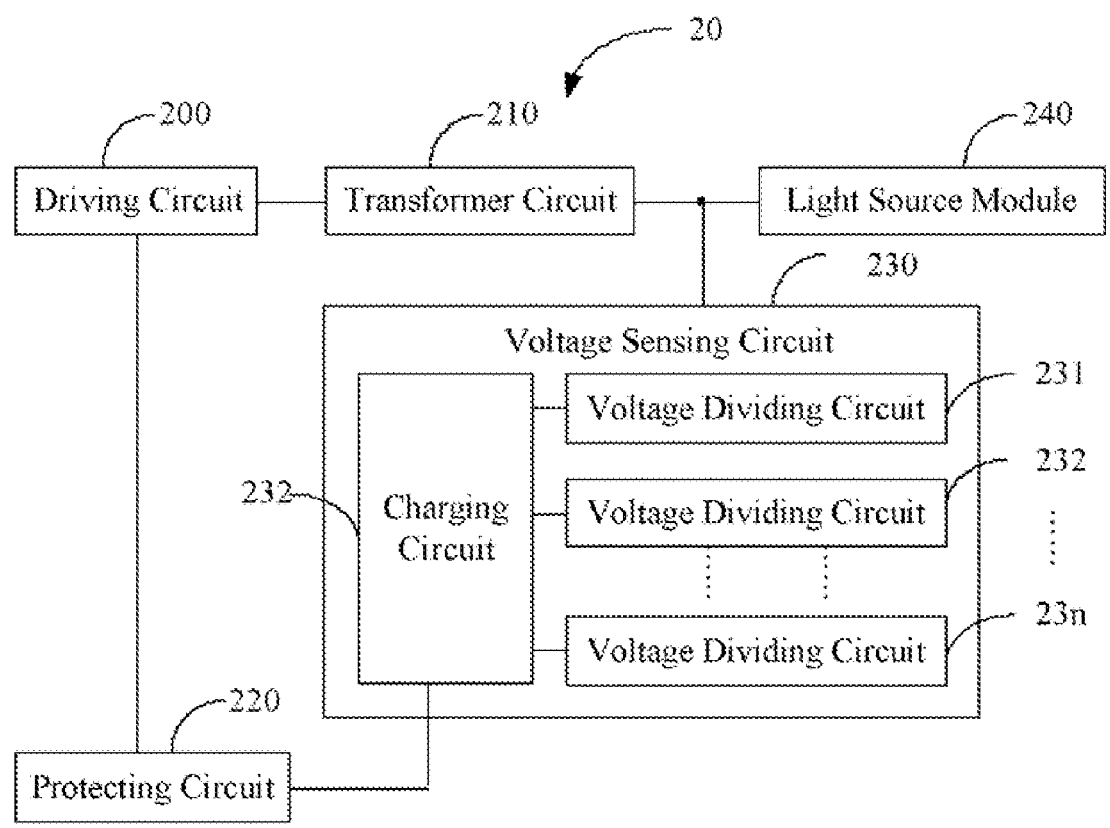
FIG. 1 is a block diagram of a driving device of an exemplary embodiment of the present invention.

FIG. 1 is a block diagram of a driving device 20 of an exemplary embodiment of the present invention. The driving device 20 for driving a light source module 240 includes a driving circuit 200, a transformer circuit 210, a protection circuit 220, and a voltage sensing circuit 230. In the exemplary embodiment, the light source module 240 includes a plurality of lamps.

The driving circuit 200 converts a received direct current (DC) signal to an alternating current (AC) signal. The transformer circuit 210 is connected to the driving circuit 200, for converting the AC signal to an appropriate signal to drive the light source module 240. In the exemplary embodiment, the AC signal output from the driving circuit 200 is a square-wave signal. The signal to drive the light source module 240 is a sine-wave signal.

The voltage sensing circuit 230 is connected to the transformer circuit 210, for sensing voltage signals provided to the light source module 240, and then outputting a sensed voltage signal to the protection circuit 220. The protection circuit 220 is connected between the voltage sensing circuit 230 and the driving circuit 200, for determining whether the sensed voltage signal is abnormal and outputting a protection signal to control the AC signal output from the driving circuit 200. In the exemplary embodiment, when there is a problem with the light source module 240, such as: receiving an over or under voltage signal, or having a short circuit, the sensed voltage signal is abnormal.

The voltage sensing circuit 230 includes a plurality of voltage dividing circuits $23n$ (n=1, 2, 3, ..., n) and a charging circuit 232. The voltage dividing circuits $23n$ (n=1, 2, 3, ..., n) are connected to corresponding lamps of the light source module 240, for dividing the voltage signals provided to the corresponding lamps. In addition, the voltage dividing circuits $23n$ (n=1, 2, 3, ..., n) are connected to the charging circuit 232, for transmitting the divided voltage signals to the charging circuit 232. When there is a problem with a lamp of the light source module 240, the divided voltage signals can be transmitted between the voltage dividing circuits via the charging circuit 232 to pull high corresponding DC levels of the divided voltage signals to controlling output of the driving circuit 200.

Figure 2:
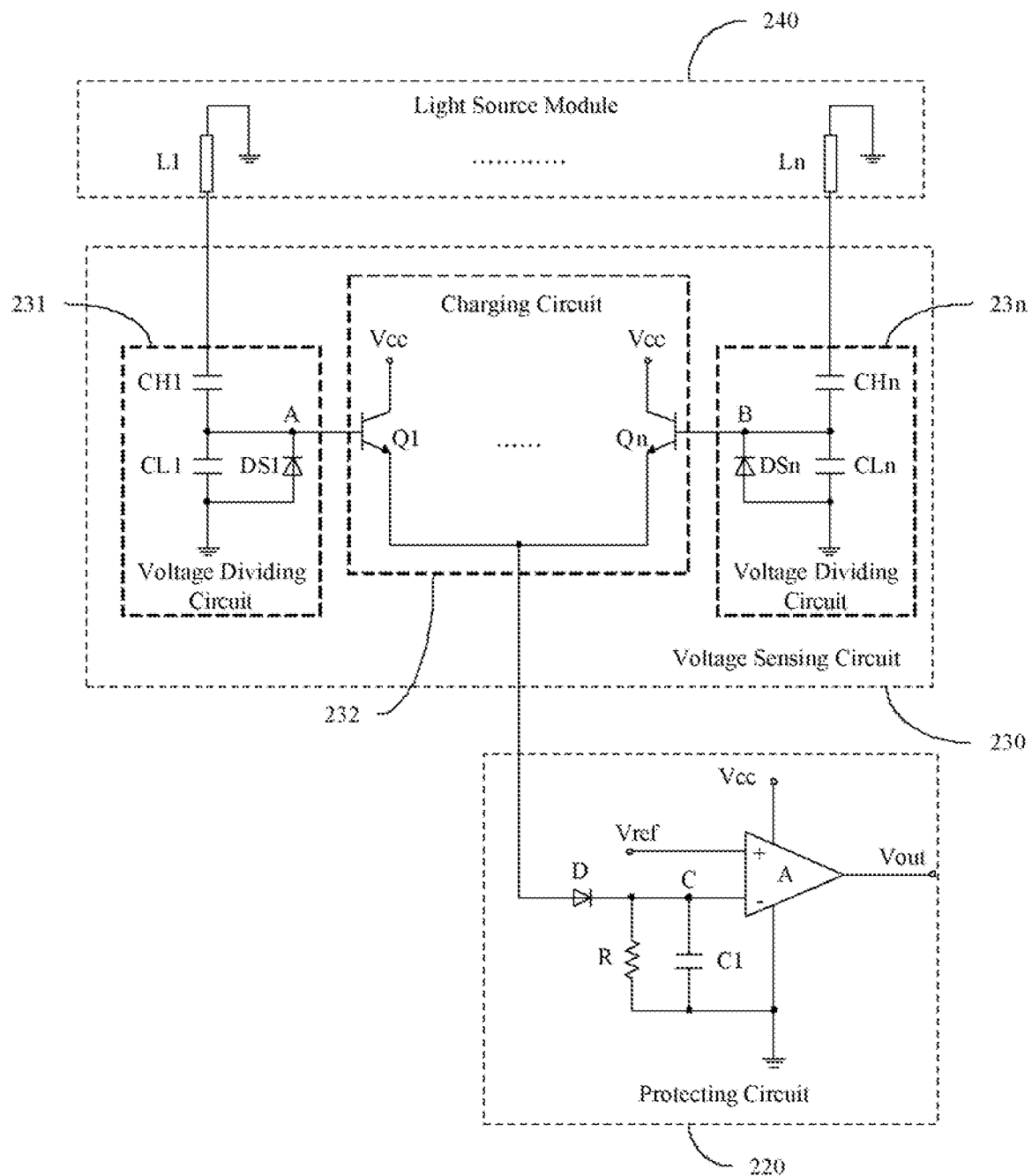
FIG. 2 is a detailed circuit diagram of a protection circuit, a voltage sensing circuit, and a light source module of FIG. 1.

FIG. 2 is a detailed circuit diagram of the protection circuit 220, the voltage sensing circuit 230, and the light source module 240 of FIG. 1 of the present invention. In the exemplary embodiment, the light source module 240 includes a plurality of lamps Ln (n=1, 2, 3, ..., n). The voltage sensing circuit 230 includes a plurality of voltage dividing circuits $231n$ (n=1, 2, 3, ..., n). Each of the voltage dividing circuits includes two capacitors and a diode. The capacitors are connected between a corresponding lamp and ground in series, for dividing a voltage signal provided to the corresponding lamp. An anode of the diode is grounded, and a cathode of the diode is connected to a node between the two capacitors, for rectifying the divided voltage signal. For example, in a voltage dividing circuit 231, capacitors CH1 and CL1 are connected between a lamp L1 and ground in series, and an anode of a diode DS1 is grounded and a cathode of the diode DS1 is connected to a node between the capacitors CH1 and CL1. Similarly, construction of the voltage dividing circuits $23n$ (n=2, 3, ..., n) are substantially the same as those of the voltage dividing circuit 231, therefore description is omitted.

The charging circuit 232 includes a plurality of transistors Qn (n=1, 2, 3, ..., n). Each of the transistors Qn (n=1, 2, 3, ..., n) has a base, an emitter, and a collector. In the exemplary embodiment, the bases of the transistors Qn (n=1, 2, 3, ..., n) are respectively connected to the cathodes of the corresponding diodes DSn (n=1, 2, 3, ..., n), and the collectors of the transistors Qn (n=1, 2, 3, ..., n) are connected to a power source Vcc. For example, the base of the transistor Q1 is connected to the cathode of the diode DS1, and the collector of the transistor Q1 is connected to the power source Vcc.

The protection circuit 220 includes a comparator A1, a diode D, a resistor R, and a capacitor C1. The comparator A1 has a first pin, a second pin, a positive input, a negative input, and an output Vout. The first pin of the comparator A1 is connected to the power source Vcc. The second pin of the comparator A1 is grounded. The positive input of the comparator A1 is connected to a reference voltage Vref. The negative input of the comparator A1 is connected to a cathode of the diode D. An anode of the diode D is connected to the collectors of the transistors Qn (n=1, 2, 3, ..., n). The resistor R is connected between the negative input of the comparator A1 and ground, and the capacitor C1 is connected to the resistor R in parallel.

In the FIG. 2, only the lamps L1 and Ln, the voltage dividing circuits 231 and $23n$, the transistors Q1 and Qn, and the protection circuit 220 are shown to demonstrate a working principle of the voltage sensing circuit 23. The cathode of the diode DS1 of the voltage dividing circuit 231 is defined as a joint A. The cathode of the diode DSn of the voltage dividing $23n$ is defined as a joint B. The cathode of the diode D of the protection circuit 220 is defined as a joint C.

When there is not a problem with lamps L1 and Ln, the divided voltage signal value of the joint A is equal to that of the joint B. The diode D of the protection circuit 220 reads the divided voltage signal value of the joint A or B, and then the divided voltage signal value is compared to the reference voltage Vref via the comparator A1.

When there is a problem with one of the lamps L1 or Ln, for example: a resistance of the lamp L1 is changed, and a phase of the voltage signal provided to the lamp L1 is shifted. Thus, the divided voltage signal value of the joint A is not equal to that of the joint B.

If a magnitude of the divided voltage signal of the joint A is greater than that of the joint B, the divided voltage signal of the joint A is transmitted to the voltage dividing circuit $23n$ via the transistors Q1 and Qn. Therefore, the capacitor CLn is charged, thereby pulling high the DC level of the divided voltage signal of the joint B to generally match that of joint A.

If the magnitude of the divided voltage signal of the joint A is less than that of the joint B, the divided voltage signal of the joint B is transmitted to the voltage dividing circuit 231 via the transistors Qn and Q1. Therefore, the capacitor CL1 is charged, thereby pulling high the DC level of the divided voltage signal of the joint A to generally match that of joint B.

In the exemplary embodiment, when the divided voltage signal of the joint A or B is transmitted between the voltage dividing circuits 231 and $23n$ via the transistors Q1 and Qn, an emitter-base voltage of the transistors Q1 or Qn is kept at a breakdown voltage, such as: 7V. In addition, a base-emitter voltage of the transistors Q1 or Qn is 0.7V. Therefore, there is a 7.7V voltage difference between the joint A and B, the divided voltage signal of the joint A or B can be transmitted between the voltage dividing circuit 231 and $23n$. In other words, a transmitting condition of a divided voltage signal between the voltage dividing circuits is that the voltage difference is more than the base-emitter voltage plus the emitter-base breakdown voltage of the transistors.

The diode D of the protection circuit 220 reads a peak value of the divided voltage signal of the joint A or B. The peak value of the divided voltage signal is stabilized via the capacitor C1, and then transmitted to the negative input of the comparator A1. The comparator A1 compares the stabilized peak value of the divided voltage signal to a voltage reference Vref. When the peak value of the divided voltage signal is less than the voltage reference Vref, the comparator A1 has no output. When the peak value of the divided voltage signal is greater than the voltage reference Vref, the comparator A1 outputs a protection signal. In the exemplary embodiment, the resistor R and the capacitor C1 form a discharge loop.

Figure 3:
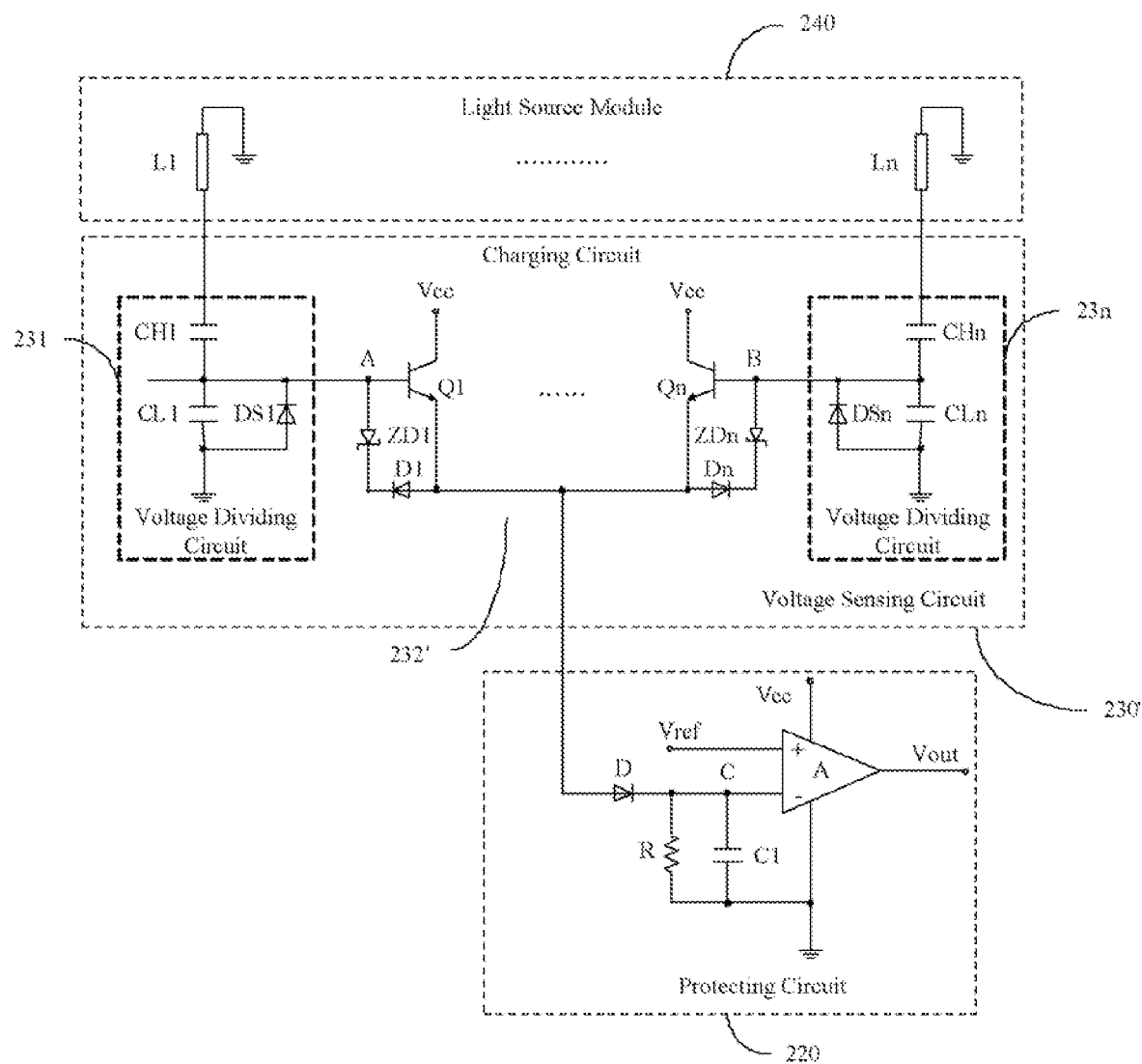
FIG. 3 is another detailed circuit diagram of the protection circuit, the voltage sensing circuit, and the light source module of FIG. 1.
Figure 4:
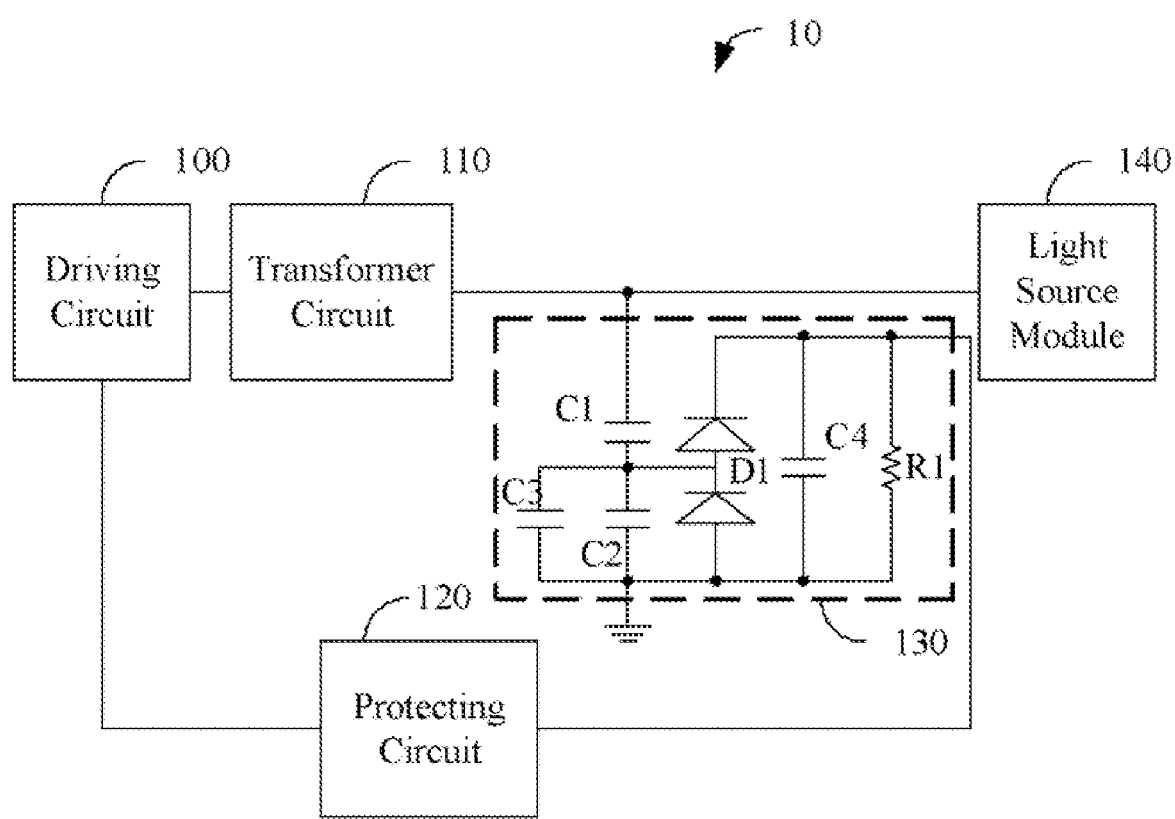
FIG. 4 is a block diagram of conventional driving device.
Figure 5:
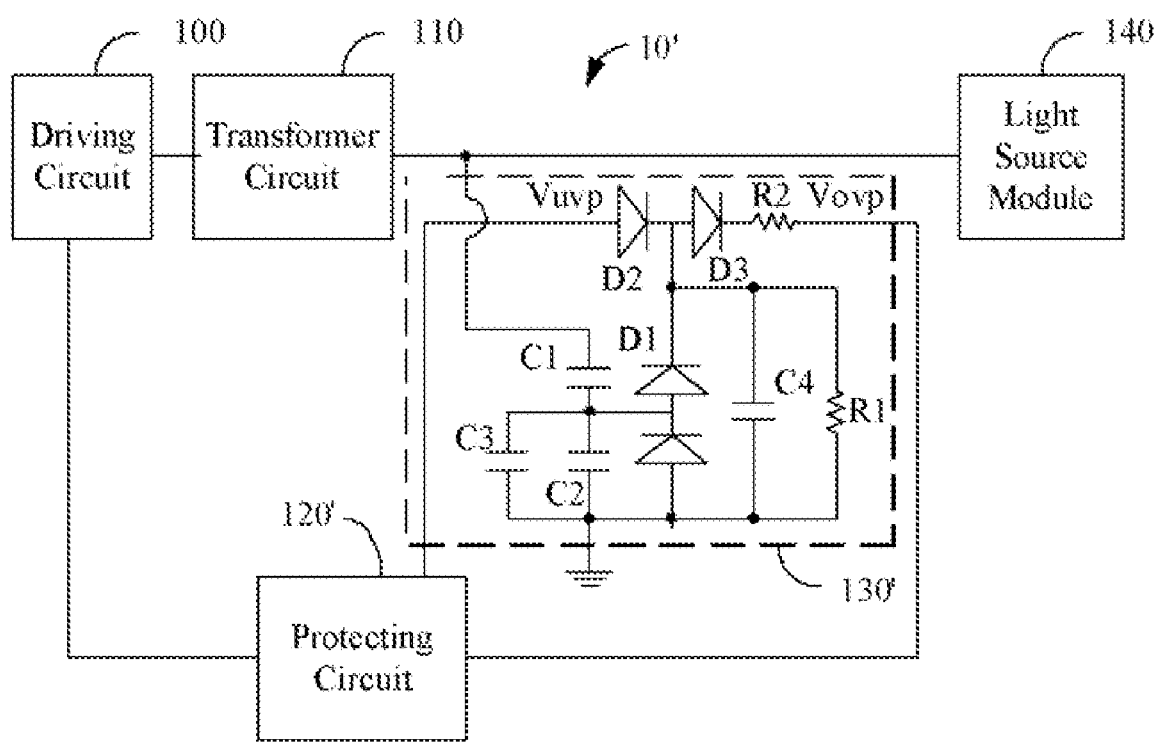
FIG. 5 is a block diagram of another conventional driving device.

FIG. 3 is another detailed circuit diagram of the protection circuit 220, the voltage sensing circuit 230, and light source module 240 of FIG. 1 of the present invention. The circuit diagram of FIG. 3 is substantially the same as that of FIG. 2 except for a charging circuit 232'. The charging circuit 232' includes a plurality of clamping circuits that are respectively connected between a base and an emitter of a corresponding transistor. Each of the clamping circuits includes a clamping diode and a diode. For example: a clamping circuit connected between the base and the emitter of the transistor Q1 includes a clamping diode ZD1 and a diode D1. A cathode of the clamping diode ZD1 is connected to the base of the transistor Q1, and an anode of the clamping diode ZD1 is connected to a cathode of the diode D1. An anode of the diode D1 is connected the emitter of the transistor Q1. In the exemplary embodiment, construction of the clamping circuits connected between the base and the emitter of the transistors Qn (n=2, 3, ..., n) are substantially the same as those of the clamping circuit connected between the base and emitter of the transistor Q1. Therefore, description is omitted. In the exemplary embodiment, the clamping diodes ZDn (n=1, 2, 3, ..., n) are zener diodes.

In the exemplary embodiment, the clamping circuits can clamp the emitter-base voltages of the transistors to other values but not 7V, such as: 3.7V. Therefore, transmitting conditions can be achieved easily. Thus, the divided voltage signal is transmitted between the voltage dividing circuit $23n$ (n=2, 3, ..., n) via the clamping circuits, not the transistors.

In the present invention, divided voltage signals can be transmitted between the voltage dividing circuits when there is a problem with one lamp of the light source module, thereby pulling high DC levels of the divided voltage signals. Therefore, the particular abnormal lamps can be detected precisely. Note that the one or more lamps receiving abnormal voltages may or may not be a cause of the abnormality. In addition, a whole circuit of the driving device of the present invention has a low output resistance, which is not susceptible to interference.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A driving device for driving a light source module comprising a plurality of lamps, the driving device comprising:
   a driving circuit, for converting a received direct current (DC) signal to an alternating current (AC) signal;
   a transformer circuit connected to the driving circuit, for converting the AC signal to an appropriate signal to drive the light source module; and
   a voltage sensing circuit connected to the transformer circuit, for sensing voltage signals provided to the lamps and outputting a sensed voltage signal, the voltage sensing circuit comprising:
      a plurality of voltage dividing circuits, connected to corresponding lamps, for dividing voltage signals provided to the lamps; and
      a charging circuit;
   wherein the voltage dividing circuits are connected to the charging circuit, the charging circuit enabling the divided voltage signals to be transmitted between the voltage dividing circuits when there is a problem with one or more lamps, thereby pulling high corresponding DC levels of the divided voltage signals.

2. The driving device as claimed in claim 1, wherein the AC signal output from the driving circuit is a square-wave signal.

3. The driving device as claimed in claim 1, wherein the signal provided to the light source module is a sine-wave signal.

4. The driving device as claimed in claim 1, wherein each of the voltage dividing circuits comprises:
   a first capacitor;
   a second capacitor, connected to the first capacitor in series and arranged between the corresponding lamp and ground, for dividing the voltage signal provided to the corresponding lamp; and
   a first diode;
   wherein a cathode of the first diode is connected to a node between the first capacitor and the second capacitor, and an anode of the first diode is grounded, for regulating the DC level of the divided voltage signal.

5. The driving device as claimed in claim 4, wherein the charging circuit comprises:
   a plurality of transistors;
   wherein each of the transistors has a base, an emitter, and a collector; and the base of each of the transistors is connected to the cathode of the first diode of the corresponding voltage dividing circuit, and the collectors of the transistors are respectively connected to a power source.

6. The driving device as claimed in claim 5, wherein the charging circuit comprises a plurality of clamping circuits, connected between the bases and the emitters of corresponding transistors, for clamping emitter-base voltages of the transistors.

7. The driving device as claimed in claim 6, wherein each of the clamping circuits comprises:
   a clamping diode; wherein an anode of the clamping diode is connected to the base of the corresponding transistor; and
   a second diode; wherein a cathode of the second diode is connected to a cathode of the clamping diode, and an anode of the second diode is connected to the emitter of the corresponding transistor.

8. The driving device as claimed in claim 5, further comprising a protecting circuit connected between the voltage sensing circuit and the driving circuit, for determining whether the sensed voltage signal is abnormal and outputting a protecting signal.

9. The driving device as claimed in claim 8, wherein the protecting circuit comprises a comparator having a positive input and a negative input; wherein the positive input of the comparator is connected to a reference voltage, and the negative input of the comparator is connected to the emitters of the transistors.

10. The driving device as claimed in claim 9, wherein the protecting circuit comprises:
    a third diode; wherein a cathode of the third diode is connected to the negative input of the comparator, and an anode of the third diode is connected to the emitters of the transistors;
    a resistor connected the negative input of the comparator and ground; and
    a capacitor connected to the resistor in parallel.

11. A driving device for driving a light source module comprising a plurality of lamps, the driving device comprising:
    a driving circuit for converting a received direct current (DC) signal to an alternating current (AC) signal;
    a transformer circuit electrically connectable between the driving circuit and the light source module for converting the AC signal from the driving circuit to an appropriate signal so as to drive the plurality of lamps of the light source module, respectively;
    a voltage sensing circuit electrically connectable between the transformer circuit and the light source module, the voltage sensing circuit comprising a plurality of voltage dividing circuits each of which corresponds to and electrically connects wit each of the plurality of lamps of the light source module for retrieving the appropriate signal for driving from the transformer circuit, and a charging circuit comprising a plurality of serially connected switches each of which corresponds to and electrically connects with the each of the plurality of voltage dividing circuits, the each of the plurality of switches responsive to abnormality of the retrieved appropriate signal by a corresponding one of the plurality of voltage dividing circuits to provide a sensed voltage signal between the plurality of switches; and a protection circuit electrically connectable between the driving circuit and the voltage sensing circuit in order to adjust the driving circuit based on the sensed voltage signal from the voltage sensing circuit.

12. The driving device as claimed in claim 11, wherein each of the voltage dividing circuits comprises:

a first capacitor;

a second capacitor, connected to the first capacitor in series, and arranged between the corresponding lamp and ground, for dividing voltage signals of the input AC signals; and a first diode; wherein a cathode of the first diode is connected to a node between the first capacitor and the second capacitor, and an anode of the first diode is grounded, for regulating the DC levels of the divided voltage signals.

13. The driving device as claimed in claim 12, wherein the charging circuit comprises:

a plurality of transistors used as the plurality of switches of the voltage sensing circuit respectively;

wherein each of the transistors has a base, an emitter, and a collector; and the base of each of the transistors is connected to the cathode of the first diode of the corresponding voltage dividing circuit, and the collectors of the transistors are respectively connected to a power source.

14. The driving device as claimed in claim 13, wherein the charging circuit comprises a plurality of clamping circuits, connected between the bases and the emitters of corresponding transistors, for clamping emitter-base voltages of the transistors.

15. The driving device as claimed in claim 14, wherein each of the clamping circuits comprises:

a clamping diode; wherein an anode of the clamping diode is connected to the base of the corresponding transistor; and a second diode; wherein a cathode of the second diode is connected to a cathode of the clamping diode, and an anode of the second diode is connected to the emitter of the corresponding transistor.

16. A driving device for driving a light source module comprising a plurality of lamps, the driving device comprising:

a driving circuit, for converting a received direct current (DC) signal to an alternating current (AC) signal;

a transformer circuit connected to the driving circuit, for converting the AC signal to an appropriate signal to drive the light source module;

a voltage sensing circuit, for outputting a sensed voltage signal according to a variable DC level when there is a problem with one or more lamps; and a protection circuit connected between the driving circuit and the voltage sensing circuit, for determining whether the sensed voltage signal is normal and outputting a protection signal to the driving circuit for adjustment;

wherein the DC level is changed by phase shifts between the lamps when there is a problem with one or more lamps.

17. The driving device as claimed in claim 16, wherein the voltage sensing circuit comprises:

a plurality of voltage dividing circuits, connected to corresponding lamps, for dividing voltage signals provided to the lamps; and a charging circuit;

wherein the voltage dividing circuits are connected to the charging circuit, the charging circuit enabling the divided voltage signals to be transmitted between the voltage dividing circuits when there is a problem with one or more lamps, thereby pulling high corresponding DC levels of the divided voltage signals.

* * * * *